A. E. WOOLNOUGH.
ANIMAL TOY.
APPLICATION FILED DEC. 22, 1917.
1,286,866.
Patented Dec. 3, 1918.
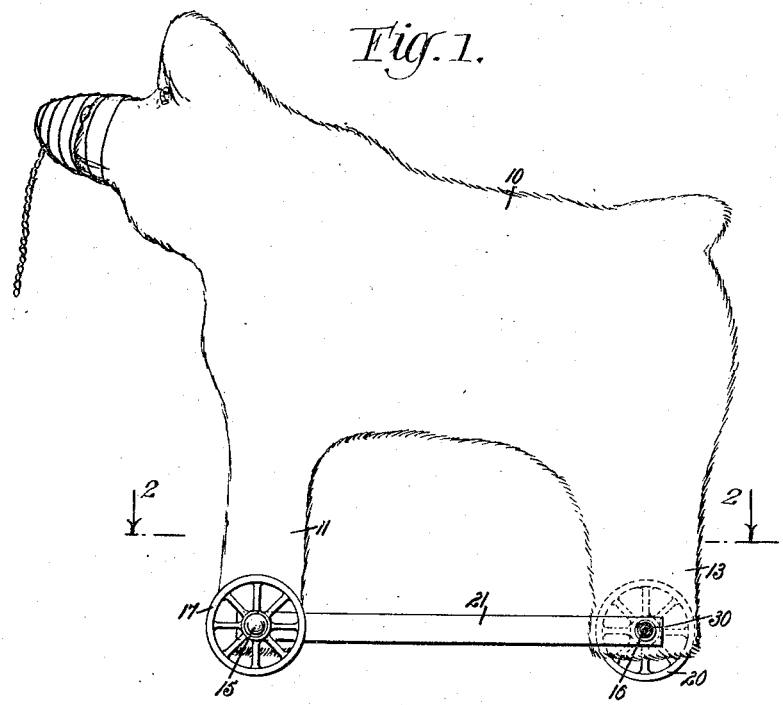
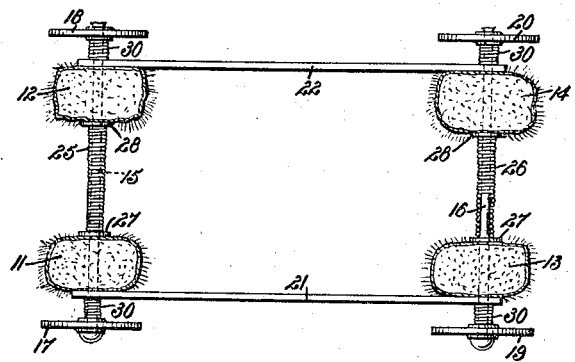
WITNESSES
INVENTOR
Albert E. Woolnough
BY
ATTORNEYS

UNITED STATES PATENT OFFICE.

ALBERT E. WOOLNOUGH, OF BROOKLYN, NEW YORK.

ANIMAL TOY.

1,286,866.  Specification of Letters Patent.  Patented Dec. 3, 1918.

Application filed December 22, 1917. Serial No. 208,388.

*To all whom it may concern:*

Be it known that I, ALBERT E. WOOLNOUGH, a citizen of the United States, and a resident of the city of New York, borough of Brooklyn, in the county of Kings and State of New York, have invented a new and Improved Animal Toy, of which the following is a full, clear, and exact description.

The invention relates to animal toys mounted on wheels to be drawn along the floor, and its object is to provide a new and improved animal toy of the quadruped type and which is exceedingly strong and durable, cheap to manufacture, with the legs and wheels properly spaced on the axles to prevent binding of the wheels on drawing the toy along.

In order to accomplish the desired result, use is made of a body having fore and hind legs, front and rear axles extending through corresponding legs and projecting beyond the sides thereof, wheels journaled on the outer ends of the said axles, and spacing members each formed of a piece of wire formed into a coil through which extends the corresponding axle, one of the spacing members extending between a pair of legs and one extending between each leg and the corresponding wheel. Use is also made of connecting bars connecting the front and rear axles with each other to give the desired strength to the toy.

A practical embodiment of the invention is represented in the accompanying drawings forming a part of this specification, in which similar characters of reference indicate corresponding parts in all the views.

Figure 1 is a side elevation of the animal toy;

Fig. 2 is a sectional plan view of the same on the line 2—2 of Fig. 1; and

Fig. 3 is a perspective view of one of the spacing members.

The body 10 of the animal toy is of the usual stuffed kind and is provided with fore legs 11 and 12 and hind legs 13 and 14, as plainly shown in the drawings. Front and rear axles 15 and 16 extend through the fore legs 11 and 12 and the hind legs 15 and 16, and the said axles project beyond the sides and legs, and on the outer ends of the axles are journaled front and rear wheels 17, 18 and 19, 20, respectively. The front and rear axles 15 and 16 are connected with each other by spacing bars 21 and 22 through which extend the axles loosely, the connecting bars being located at the outer sides of the legs 11, 12 and 13, 14.

In order to hold the fore legs 11 and 12 and the hind legs 13 and 14 properly spaced apart, use is made of spacing members 25 and 26, each preferably in the form of a piece of wire formed into a coil through which extends the corresponding axle 15 or 16. Washers 27 and 28 are held on each axle 15 and 16 and abut against the inner sides of the corresponding legs 11, 12 and 13, 14, and the spacing members 25 and 26 have their outer ends abutting against the washers 27 and 28. Thus by the arrangement described the fore legs 11 and 12 and the hind legs 13 and 14 are held properly spaced apart. Spacing members 30 of a construction similar to the spacing members 25 and 26 are arranged on the axles 15, 16 between the spacing bars 21, 22 and the corresponding wheels 17, 18, 19 and 20. Thus the wheels are rendered practically parallel with the connecting bars 21 and 22 without danger of binding on the axles to insure an easy drawing along of the animal toy over a floor, sidewalk or other surface.

The spacing members 25, 26 and 30 can be very cheaply manufactured and readily slipped in place on the axles between the parts mentioned so that the parts can be readily assembled and the toy can be cheaply manufactured.

Having thus described my invention, I claim as new and desire to secure by Letters Patent:—

1. An animal toy of the quadruped type, comprising a body having fore and hind legs, front and rear axles extending through the corresponding legs and projecting beyond the sides thereof, wheels journaled on the outer ends of the axles, and spacing members each formed of a piece of wire formed into a coil through which extends the corresponding axle, one of the spacing members extending between a pair of legs and one extending between each leg and the corresponding wheel.

2. An animal toy of the quadruped type, comprising a body having fore and hind legs, front and rear axles extending through the corresponding legs and projecting beyond the sides thereof, wheels journaled on the outer ends of the axles, connecting bars connecting the front and rear axles with each other adjacent the outer sides of the legs and tubular spacing members on the axles for holding the legs spaced apart and the wheels spaced from the legs and connecting bars.

3. In an article of the character described, an axle, wheels mounted upon the extremities of the axle, a body having lateral spaced portions through which the axle passes, a sleeve disposed to surround said axle between the spaced portions, washers loosely surrounding the axle at the end of the sleeve, and sleeves disposed between said spaced portions and the outer ends of the axle, each of said sleeves being formed of a coiled spring.

ALBERT E. WOOLNOUGH.

Copies of this patent may be obtained for five cents each, by addressing the "Commissioner of Patents, Washington, D. C."